(12) United States Patent
Bampton

(10) Patent No.: US 8,858,869 B2
(45) Date of Patent: Oct. 14, 2014

(54) METHOD FOR TREATING A POROUS ARTICLE

(75) Inventor: Clifford C. Bampton, Thousand Oaks, CA (US)

(73) Assignee: Aerojet Rocketdyne of DE, Inc., Canoga Park, CA (US)

( * ) Notice: Subject to any disclaimer, the term of this patent is extended or adjusted under 35 U.S.C. 154(b) by 288 days.

(21) Appl. No.: 13/021,249

(22) Filed: Feb. 4, 2011

(65) Prior Publication Data

US 2012/0202087 A1 Aug. 9, 2012

(51) Int. Cl.
*B22F 3/26* (2006.01)

(52) U.S. Cl.
CPC .............. *B22F 3/26* (2013.01); *B22F 2998/00* (2013.01); *B22F 2998/10* (2013.01); *B22F 2999/00* (2013.01)
USPC ................................................. 419/6; 419/27

(58) Field of Classification Search
USPC .................................................... 419/2, 6, 27
See application file for complete search history.

(56) References Cited

U.S. PATENT DOCUMENTS

| 4,554,218 | A | * | 11/1985 | Gardner et al. ............... 428/567 |
|---|---|---|---|---|
| 4,708,847 | A | | 11/1987 | Donomoto et al. |
| 4,769,071 | A | | 9/1988 | Klar et al. |
| 5,745,834 | A | | 4/1998 | Bampton |
| 6,238,614 | B1 | * | 5/2001 | Yang et al. ..................... 264/497 |
| 6,451,385 | B1 | | 9/2002 | Hilden et al. |
| 6,814,926 | B2 | * | 11/2004 | Geving et al. ..................... 419/5 |
| 7,060,222 | B2 | * | 6/2006 | Sachs et al. ..................... 419/27 |
| 7,722,806 | B1 | | 5/2010 | Weinstein |
| 2004/0009086 | A1 | | 1/2004 | Sachs |
| 2004/0211538 | A1 | * | 10/2004 | Lorenz et al. .................. 164/98 |
| 2005/0112015 | A1 | | 5/2005 | Bampton |
| 2005/0161189 | A1 | | 7/2005 | Sercombe |
| 2006/0147332 | A1 | * | 7/2006 | Jones et al. ....................... 419/8 |
| 2007/0141375 | A1 | * | 6/2007 | Budinger et al. ............. 428/548 |

FOREIGN PATENT DOCUMENTS

| EP | 0502426 | 9/1992 |
|---|---|---|
| EP | 0836904 | 4/1998 |
| GB | 2275437 | 8/1994 |

OTHER PUBLICATIONS

European Search Report dated May 12, 2012.

* cited by examiner

*Primary Examiner* — George Wyszomierski
*Assistant Examiner* — Ngoclan T Mai
(74) *Attorney, Agent, or Firm* — Joel G Landau

(57) ABSTRACT

A method of treating a porous work piece includes infiltrating a liquid metallic alloy into surface porosity of a work piece and isothermally solidifying the liquid metallic alloy to at least partially fill the surface porosity.

10 Claims, 1 Drawing Sheet

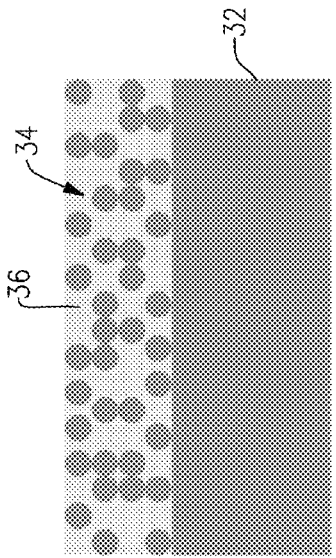
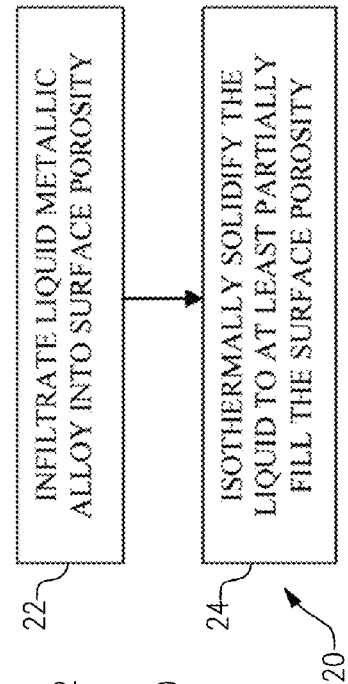
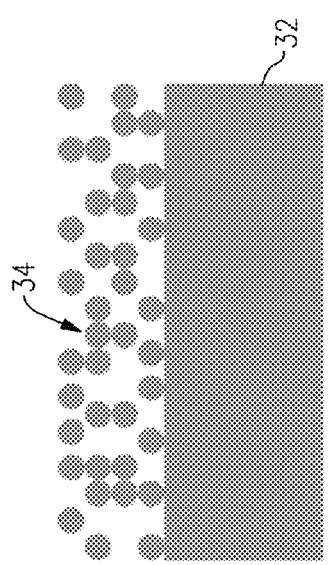
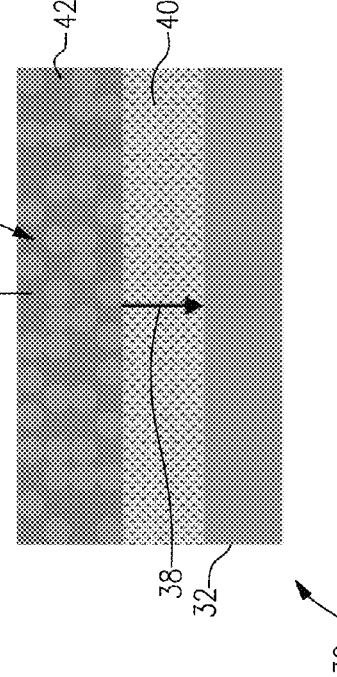

METHOD FOR TREATING A POROUS ARTICLE

BACKGROUND

This disclosure relates to the processing of metallic articles.

Powder processing techniques for producing metallic articles are intended to produce fully solid articles but may instead result in a small amount of porosity. For instance, a process known as electron beam melting ("EBM") progressively consolidates layers of a metallic powder. The layers are melted together utilizing a computer controlled electron beam to build-up the part according to a computer aided design model. Although the bulk core of the part is solid and substantially pore-free, incomplete melting and consolidation of the powder at the surfaces of the part may result in surface porosity. Typically, a machining step follows the EBM process to remove the surface porosity.

BRIEF DESCRIPTION OF THE DRAWINGS

The various features and advantages of the disclosed examples will become apparent to those skilled in the art from the following detailed description. The drawings that accompany the detailed description can be briefly described as follows.

FIG. 1 shows an example method of treating a porous work piece.

FIG. 2 depicts an initial work piece prior to treatment.

FIG. 3 depicts an example work piece during treatment.

FIG. 4 depicts an example work piece after treatment.

DETAILED DESCRIPTION OF THE PREFERRED EMBODIMENT

FIG. 1 illustrates an example method 20 for treating a porous work piece or article. As an example, parts made by electron beam melting ("EBM"), or even other powder processing techniques, may exhibit porosity that is undesired in the final part. The example method 20 provides a way to fill the porosity and thereby eliminate the need for post-machining to remove porosity, while also conferring other desirable properties on the final part.

The method 20 generally includes an infiltration step 22 and a solidification step 24. In the infiltration step 22, a liquid metallic alloy is infiltrated into the surface porosity of a work piece or article. The liquid metallic alloy is then isothermally solidified in the solidification step 24 to thereby fill the surface porosity of the work piece or article. The method 20 will be further described with reference to FIGS. 2-4, which show the progression of an article 30 through the steps of the method 20.

FIG. 2 shows a portion of the article 30 that is to undergo the method 20 of treating a porous work piece. As an example, the article 30 may be a gas turbine engine part, such as a turbine component. In a further example, the article 30 is an integrally bladed disk for a low pressure turbine section of a gas turbine engine. However, it is to be understood that the article 30 is not limited to any particular type and that the examples disclosed herein may be applied to other types of parts.

As shown, the article 30 includes a body 32 that is generally formed from a first metallic alloy. The first metallic alloy may be a titanium-aluminum alloy (e.g., gamma titanium aluminide), nickel-based superalloy, or other type of alloy that is suitable for the intended end use of the article 30.

The body 32 of the article 30 includes a surface porosity 34, which may be the result of the manufacturing process that is used to form the body 32. In an embodiment, the surface porosity 34 is a result of an EBM process. In such a process, successive layers of a metallic powder having the composition of the alloy of the body 32 are spread and selectively consolidated using an electron beam. The electron beam consolidates portions of the metal powder according to a computer aided design model, for example. It is to be understood that the disclosed EBM process is not limited to any particular type and may be applied to variations of the EBM process or even other processes that result in surface porosity.

As shown in FIG. 3, a liquid metallic alloy 36 is infiltrated into the surface porosity 34. The method used to infiltrate the liquid metallic alloy 36 into the surface porosity 34 may include submerging at least a portion of the body 32 within the liquid such that capillary forces within the surface porosity 34 act to pull the liquid into the pores.

Alternatively, the body 32 is wrapped or at least partially wrapped in a solid foil having the desired composition. The body 32 and foil are then heated at a temperature that is above the melting temperature of the metal alloy of the foil to melt the alloy and infiltrate the liquid into the surface porosity 34.

In another alternative, a metallic powder having the desired composition is mixed with a carrier, such as a binder, and applied onto the surface of the body 32. The powder is then melted to infiltrate the liquid into the surface porosity 34.

In embodiments, the composition of the metallic alloy is selected to reduce the temperature that is needed to melt the metallic alloy and thereby reduce any effects of heat on the body 32. For instance, the metallic alloy may be of a eutectic composition. In one example, the metallic alloy is a eutectic composition of silver-aluminum and includes approximately 28 wt. % of aluminum with a balance of silver.

Referring to FIG. 4, the article 30 is held or maintained in an environment that is at a temperature above the melting temperature of the metallic alloy (i.e., isothermal). A constituent element 40 of the metallic alloy is selected to be readily soluble within the base metal alloy of the body 32. The constituent element 40 diffuses into the body 32 from the region of the surface porosity 34. In areas of the body 32 near the surface porosity 34 there is a relatively higher concentration of the constituent element 40, while in areas farther away in proximity from the surface porosity 34, there is a lower concentration of the constituent element 40. The diffusion results in a concentration gradient 38 within the body 32, which may be checked using a prolongation feature on the article 30 that may be removed for metallographic inspection. The article 30 may be held at the temperature for approximately 0.1-10 hours, depending on the composition of the body 32 and metallic alloy. For a metallic alloy of silver-aluminum and a body 32 of titanium aluminide, the time may be approximately one hour.

The diffusion of the constituent element 40 from the liquid metallic alloy 36 causes the composition of the liquid metallic alloy 36 to change and isothermally solidify to form solidified metallic alloy 36', which fills the pores of the surface porosity 34. That is, as the constituent element 40 diffuses into the body 32, the composition of the remaining alloy 42 moves away from the eutectic composition to a composition that has a higher melting point. In some examples, a substantial amount of the constituent element 40 of the metallic alloy diffuses into the body 32 of the article 30 such that only the other constituent 42 or constituents of the metallic alloy remain within the surface porosity 34 of the body 32.

In embodiments, if the body 32 is made of a titanium-aluminum alloy, such as gamma titanium aluminide, the metallic alloy is a silver-aluminum alloy. The element silver is readily soluble within gamma titanium aluminide and thereby diffuses from the area of the surface porosity 34 into the bulk of the body 32. The remaining aluminum within the surface porosity 34 alloys with the titanium and solidifies to fill in the surface porosity 34. Thus, the surface region that was previously porous is now solid and rich in aluminum.

The filling of the surface porosity 34 also eliminates the need for machining the article 30 after the forming process that resulted in the surface porosity 34. Moreover, depending upon the alloy of the body 32 and the metallic alloy selected to fill the surface porosity 34, the constituent element 40 that diffuses into the body 32 may also have an influence on the properties of the body 32. For instance, in the case of a body 32 made of titanium aluminide, the silver that diffuses from the liquid metallic alloy into the bulk of the body 32 leaves the surface region rich in aluminum. The aluminum then oxidizes to alpha alumina that acts as a passive layer to protect the article 30 from oxidation. Alpha alumina is preferred because it is highly stable and desirable for passivating the article 30 with regard to oxidation. Similar effects are expected for a body 32 that is made of a superalloy, such as a nickel-based, cobalt-based, cobalt-chromium based or iron-based superalloy, and a liquid metallic alloy of nickel-boron, wherein the boron would diffuse into the body 32. In such examples, boron is the eutectic-former. The superalloys may additionally have use in areas such as medical technology, such as for implants, to alloy custom fabrication for each patient.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of treating a porous work piece, comprising:
spreading successive layers of a metal powder and selectively consolidating the metal powder of each layer using an electron beam to form a work piece having surface porosity, wherein the work piece has a non-porous body portion on which the surface porosity is located;
infiltrating a liquid metallic alloy into the surface porosity;
solidifying the liquid metallic alloy to at least partially fill the surface porosity; and
diffusing at least one constituent of the liquid metallic alloy into the work piece such that there is a concentration gradient of that constituent in the work piece.

2. The method as recited in claim 1, wherein the metal powder is selected from a group consisting of a titanium-aluminum alloy and a superalloy.

3. The method as recited in claim 1, including isothermally solidifying the liquid metallic alloy.

4. The method as recited in claim 1, wherein the metal powder is a titanium-aluminum alloy.

5. The method as recited in claim 1, wherein the infiltrating of the liquid metallic alloy into the surface porosity includes submerging at least a portion of the work piece in the liquid metallic alloy.

6. The method as recited in claim 1, wherein the infiltrating of the liquid metallic alloy into the surface porosity includes contacting the work piece with a foil that is made of the metallic alloy and then melting the foil.

7. A method of treating a porous work piece, comprising:
spreading successive layers of a metal powder and selectively consolidating the metal powder of each layer using an electron beam to form a work piece having surface porosity;
infiltrating a liquid metallic alloy into the surface porosity, wherein the liquid metallic alloy is a silver-aluminum alloy; and
solidifying the liquid metallic alloy to at least partially fill the surface porosity.

8. The method as recited in claim 7, wherein the silver-aluminum alloy has a eutectic composition.

9. The method as recited in claim 7, wherein the aluminum oxidizes after the solidifying to form an alumina passive layer on the work piece.

10. The method as recited in claim 9, wherein the alumina is alpha alumina.

* * * * *